United States Patent [19]

Yu

[11] Patent Number: 5,108,588

[45] Date of Patent: Apr. 28, 1992

[54] STRUCTURE OF VIBRO SEPARATOR

[76] Inventor: Si L. Yu, No. 67, Lane 38, Kuang Fu Rd., Sec. 2, Sanchung City, Taipei, Taiwan

[21] Appl. No.: 612,517

[22] Filed: Nov. 13, 1990

[30] Foreign Application Priority Data

Mar. 23, 1990 [JP] Japan .................................. 2-30168[U]

[51] Int. Cl.⁵ .......................... B07B 1/36; B07B 1/42; B01D 33/29
[52] U.S. Cl. .................................. 209/257; 209/237; 209/325; 209/367; 210/385; 210/388
[58] Field of Search ............ 209/237, 325, 326, 366.5, 209/367, 240, 255, 257

[56] References Cited

U.S. PATENT DOCUMENTS

| | | | |
|---|---|---|---|
| 2,284,671 | 6/1942 | Meinzer | 209/237 X |
| 3,463,727 | 8/1969 | Fahey | 209/326 X |
| 3,478,406 | 11/1969 | Auckland | 209/366.5 X |
| 3,481,468 | 12/1969 | Tonjes | 209/237 |
| 3,794,165 | 2/1974 | Riesbeck et al. | 209/325 |

FOREIGN PATENT DOCUMENTS 0641560 5/1962 Canada ............................... 209/326
1309942 10/1962 France ............................... 210/385

OTHER PUBLICATIONS

Sweco® Vibro-Energy Separators brochure, Oct. 1973, pp. 1–22.

Primary Examiner—Michael S. Huppert
Assistant Examiner—Edward M. Wacyra
Attorney, Agent, or Firm—Bucknam and Archer

[57] ABSTRACT

A vibro separator, comprising a separator unit which is comprised of a screen assembly releasably mounted on a hopper at the top, which screen assembly has a screen releasably fastened therein; a vibrator unit which is comprised of a motor directly or indirectly attached to the hopper at the bottom for driving two eccentric weights to rotate via a revolving shaft; and a base which has springs for flexibly supporting the vibrator unit and the separator unit.

2 Claims, 4 Drawing Sheets

STRUCTURE OF VIBRO SEPARATOR

BACKGROUND OF THE INVENTION

The present invention relates to separators, and more particularly to a vibro separator for separating powdered material into two parts of different grain fineness or for filtrating substances from liquid.

There are various types of vibro separators commonly used for separating powdered materials or substances be filtered from liquid. Disadvantages of the conventional vibro separators are numerous and generally outlined hereinafter.

1) They are generally large and heavy and difficult to move;
2) It is very complicated to replace a screen;
3) In comparison with machine body, the screen size is relatively very small;
4) Mechanical structure is complicated and difficult to maintain;
5) They are not suitable for screening various different materials in small quantity;
6) High noise level is produced during operation; and
7) large floor space is generally required for installation.

SUMMARY OF THE INVENTION

The present invention has been accomplished to provide a vibro separator which can achieve various advantages as outlined hereinafter:

1) It is easy to move because its size and weight are greatly reduced in comparison with competitive models of similar capacity;
2) Screen can be conveniently replaced within short length of time;
3) Screen size is relatively larger than machine body so that efficient screening process can be achieved.
4) The structure is simple and easy to maintain;
5) Separated material can be rapidly discharged; and
6) It is very suitable for screening various different materials in small quantity; and
7) Low noise level will be produced during operation.

According to the present invention, a vibro separator comprises a separator unit, a vibrator unit, a base and a plurality of flexible means. The separator unit is comprised of a screen assembly releasably mounted on a hopper at the top, which screen assembly has a screen releasably fastened therein. The vibrator unit is comprised of a motor directly or indirectly attached to the hopper at the bottom for driving two eccentric weights to rotate via a revolving shaft. The flexible means are fastened in the base means for flexibly supporting the vibrator unit and the separator unit.

By means of the flexible means, the vibrator unit and the separator unit are flexibly vertically supported above the base. By means of the effect of the two weights which are respectively secured to the revolving shaft at two opposite ends, the vibrator unit is forced to vibrate horizontally, vertically and obliquely and simultaneously carry the separator unit to eccentrically vibrate for performing screening operation. Further, by changing the angle position of the two eccentric weights relative to the revolving shaft, the vibrating motion of the separator unit can be properly adjusted.

BRIEF DESCRIPTION OF THE DRAWINGS:

The present invention will now be described by way of example only, with reference to the annexed drawings, in which.

Figure 1:
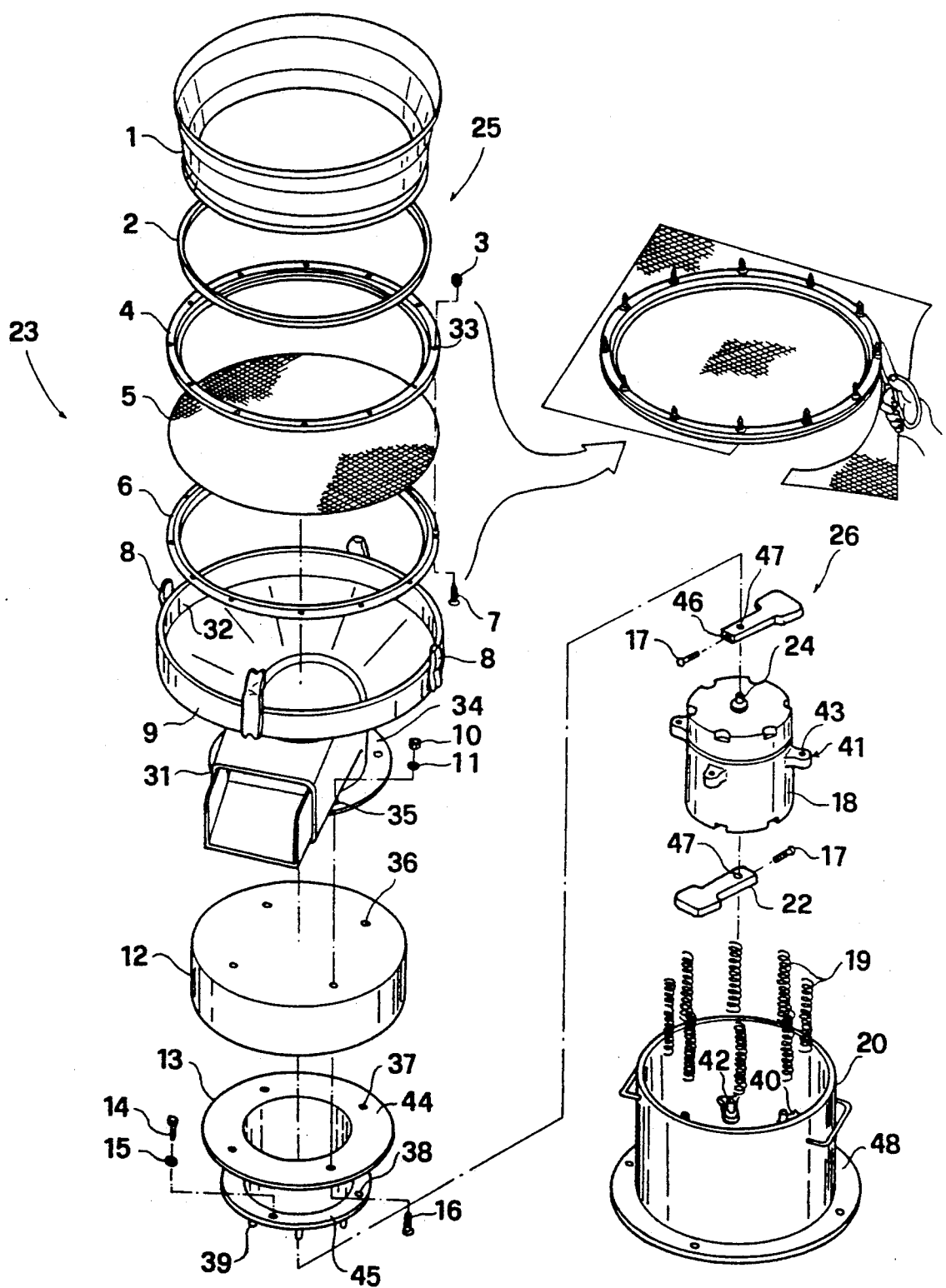
FIG. 1 is a perspective dismantled view of the preferred embodiment of the present invention.
Figure 2:
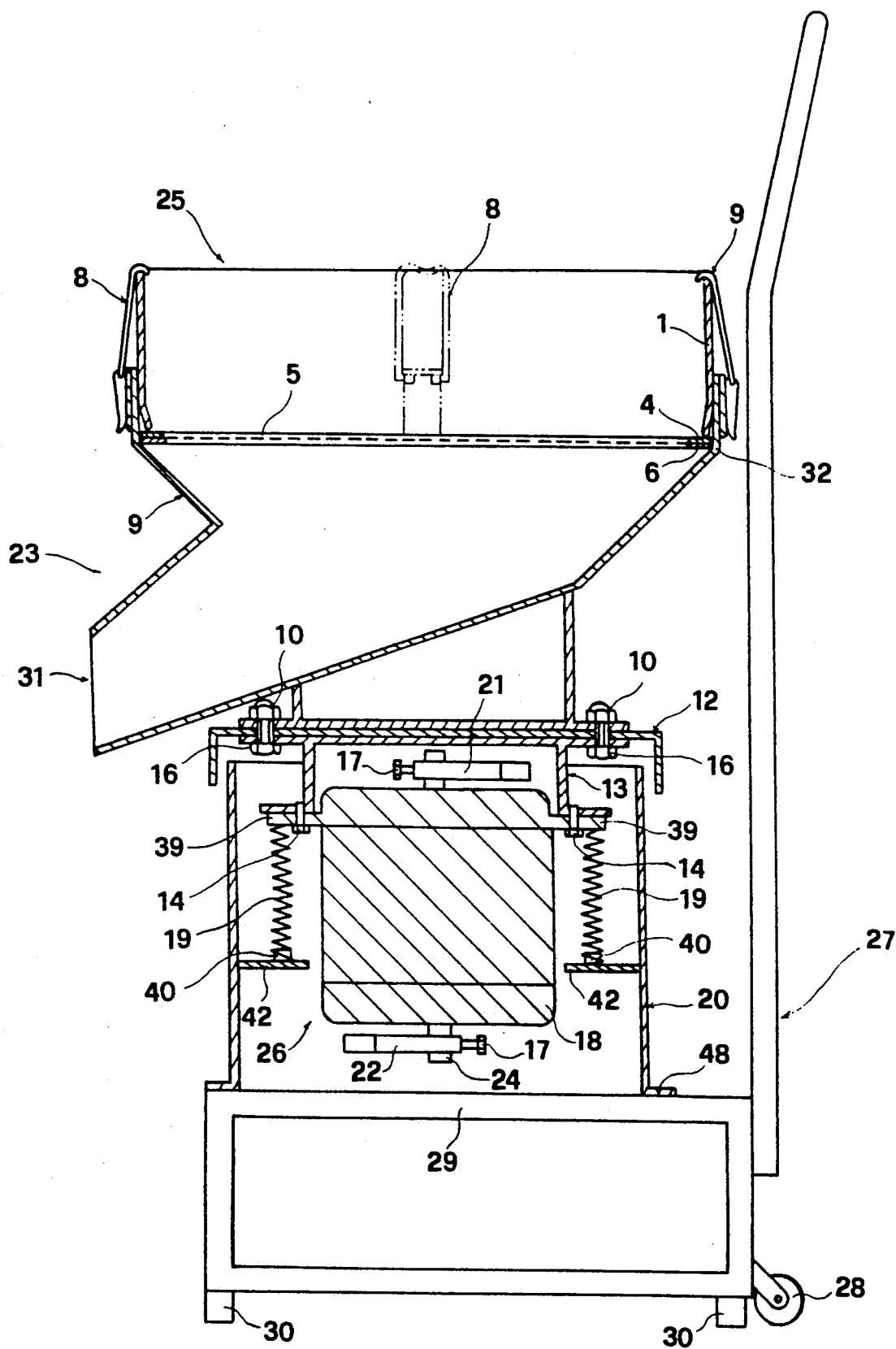
FIG. 2 is a longitudinal sectional view thereof.

DETAILED DESCRIPTION OF THE PREFERRED EMBODIMENT:

Referring to FIGS. 1 and 2, there is illustrated a vibro separator embodying the present invention and generally comprised of a separator unit 23 which is comprised of a screen assembly 25 and a hopper 9, a vibrator unit 26 which is comprised of a motor 18, an upper weight 21 and a lower weight 22, a base 20 which is mounted on the ground or a weight carrier 27, and a plurality of helical springs 19 which are fastened in the base for supporting the vibrator unit and the separator unit.

The screen assembly 25 is comprised of a frame 1 which is made of wooden or steel material in substantially cylindrical shape, a ring-shaped packing rubber 2, an upper rack 4, a lower rack 6 and a circular screen 5. The upper and lower racks 4 and 6 are shaped like a ring and have each a plurality of through-holes 33 equidistantly spaced from each other. Through the through-holes 33, screws 7 are respectively inserted to connect with bolt caps 8 permitting the screen 5 to be firmly retained between the upper rack 4 and the lower rack 6. After the screen 5 is firmly retained between the racks 4 and 6, the ring-shaped packing rubber 2 and the frame 1 is mounted thereon to built up a screen assembly 25. The hopper 9 is substantially shaped like a morning-glory, having a plurality of unitary hooks 8 extending upward from the topmost edge thereof for securing the screen assembly 25, a circular connecting portion 32 internally at the top for holding the screen assembly 25, a discharge port 31 obliquely extending downward at one side, and a flange 34 at the bottom with a plurality of mounting holes 35 made thereon.

The motor 18 is indirectly secured to the hopper 9 of the separator unit 23 through a vibrating body 13 and a cover 12. The cover 12 has a plurality of round holes 36 made thereon at the top and in quantity and locations corresponding to the mounting holes 35 on the flange 34 of the hopper 9. The vibrating body 13 is substantially shaped like a cylinder, having two flanges 44 and 45 at two opposite end, wherein the top flange 44 has a plurality of mounting holes 37 made thereon; the bottom flange 45 has a plurality of mounting holes 38 and a plurality of unitary pins 39 vertically extending downward at the bottom. The vibrating body 13 is attached to the bottom flange 34 of the hopper 9 by bolts 16, bolt caps 10 and washers 11 with the cover 12 firmly retained therebetween. As an alternate form, the motor 18 may be directly attached to the hopper 9. In this manner, the hopper 9, the cover 12 and the vibrating body 13 are integrally incorporated into a solid piece during production.

As described above, the vibrator unit 26 is comprised of a motor 18, an upper weight 21 and a lower weight 22. The motor 18 has a motor shaft 24 vertically disposed at the center and a plurality of ear-like projections 41 radially horizontally extending from the housing thereof, which projections 41 have each a mounting hole 43 thereon. The upper and lower weights 21 and 22 are respectively designed in a substantially T-shaped structure disposed in a horizontal position, having each a hole 47 on the top communicating with a bolt hole 46 at one end. Through the hole 47, the upper and lower weights 21 and 22 are respectively mounted on the motor shaft 24 and adjustably secured thereto by a bolt each 17 which is inserted in the bolt hole 46 of the weight 21 or 22. By fastening bolts 14 and washers 15 on the bottom flange 45 through the mounting holes 38 thereof into the mounting holes 43 of the ear-like projections 41, the vibrator unit 26 is fixedly secured to the separator unit 23.

The base 20 is designed in a substantially cylindrical shape, having a flange 48 at the bottom and a plurality of projecting strips 42 extending inwards around the inner wall surface thereof, which projecting strips 42 have each a unitary pin 40 upstanding at the top. The separator unit 23 and the vibrator unit 26 are flexibly mounted on the base 20 and supported by a plurality of helical springs 19 which are respectively secured between the pins 40 on the projecting strips 42 and the pins 39 on the bottom flange 45 of the vibrating body 13. The base 20 may be placed on the table 29 of a weight carrier 27 so that it can be conveniently moved to a desired place. The numeral 28 designates wheel while the numeral 30 designates stand.

After the helical springs 19 are respectively connected to the pins 40 of the projecting strips 42 and the motor shaft 24 is inserted through the holes 47 of the upper and lower weights 21 and 22, the upper and lower weights 21 and 22 are respectively adjusted to a desired position and then secured in place by respective bolt 17. Then, the vibrator unit 26 is properly secured to the bottom flange 45 of the vibrating body 13 by bolts 14 with the pins 38 of the vibrating body 13 respectively inserted in the helical springs 19 from the top, permitting the vibrator unit 26 and the vibrating body 13 to be flexible supported by the helical springs 19 above the base 20. The cover 12 is then placed on the vibrating body 13 for supporting the hopper 9. After the holes 37, 36 and 35 are respectively aligned, the hopper, the cover 12 and the vibrating body 13 are firmly secured together by bolts 16 and bolt caps 10. After the separator unit 23 is mounted on the circular connecting portion 32 of the hopper 9 it is retained in place by the hooks 8 of the hopper 9.

The operation of the present invention is outlined hereinafter.

1) Mount a screen 5 in the screen assembly 25 and then, fasten the screen assembly 25 in the circular connecting portion 32 of the hopper 9;
2) Hook up the frame 1 by the hooks 8 of the hopper 9;
3) Turn on power switch to start the vibro separator and then, put the powdered material or liquid to be separated or filtered inside the frame 1; and
4) The powdered material or liquid which passes through the screen assembly is discharged through the discharge port for further recovery.

Figure 3:
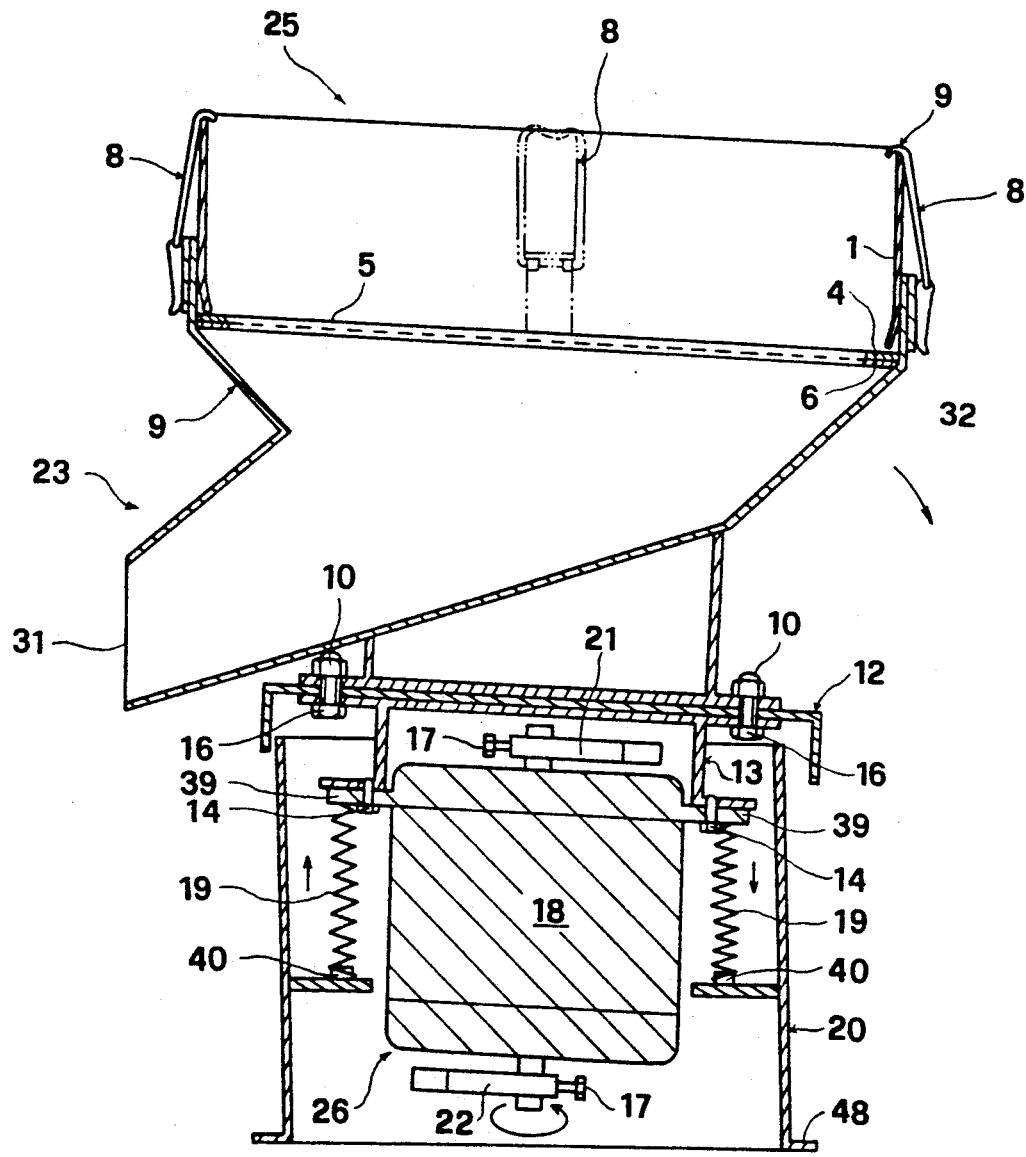
FIG. 3 and 4 are schematic sectional views, showing the vibrating motion of the present invention.
Figure 4:
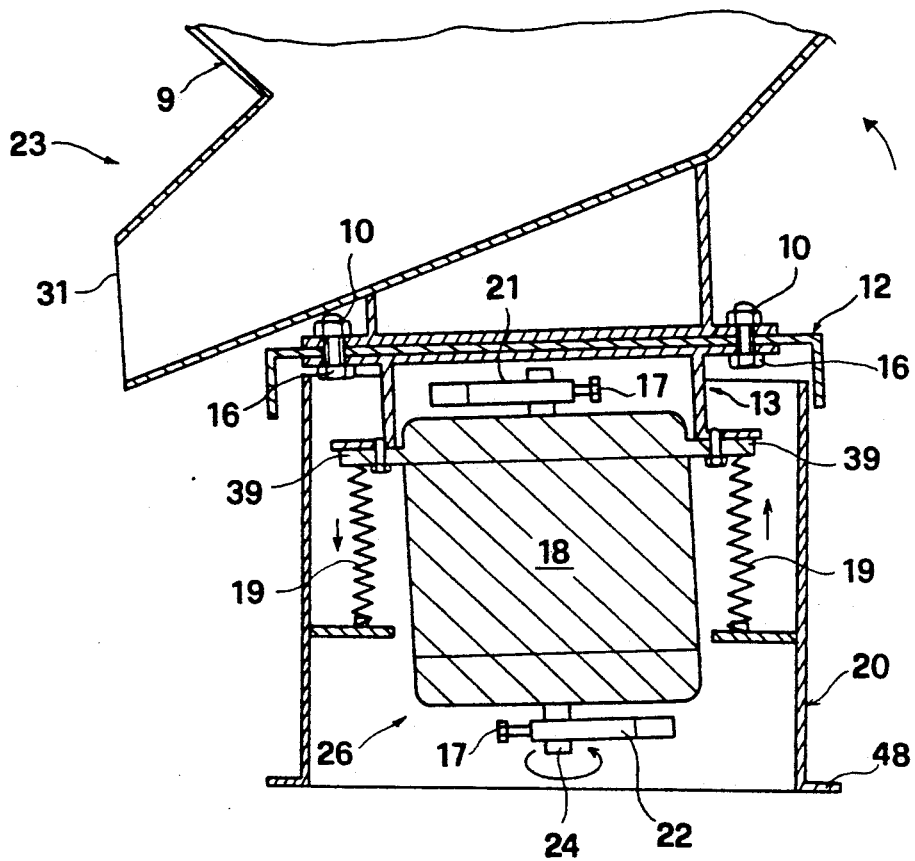

As shown in FIG. 2, the upper and lower weights 21 and 22 are respectively fastened in the motor 18. Once the motor 18 is turned on, the present vibro separator is vibrated in directions as shown in FIGS. 3 and 4. Since the separator unit 23 and the vibrator unit 26 are fixedly connected together and flexibly supported by the helical springs 19, the operation of the motor 18 drives the upper and lower weights 21 and 22 to vibrate and rotate. During vibrating and rotating of the weights 21 and 22, an eccentric force is resulted to force the motor 18 to incline. Because the motor shaft 24 keeps rotating at high speed during inclination of the motor 18, the vibrator unit 26 and the connected separator unit 23 are simultaneously vibrated in horizontal, vertical and oblique directions. Therefore, by adjusting the position of the weights 21 and 22 relative to the motor shaft 24, different vibrating motion of the present vibro separator can be achieved.

Further, it is to be understood that the foregoing description is for best understanding of the present invention. Various modifications may be made without departing from the basic teachings of the present invention. For example, the ring-shaped packing rubber 2 may be eliminated, the frame 1 and the upper rack 4 may be integrally shape formed for connection with the lower rack 6 to retain a screen 5 therebetween so as to set up a screen assembly 50.

What is claimed is:

1. A vibro separator for separating a substance into two portions of different fineness or for filtering a substance from a liquid which consists of a separator unit (23) comprising a screen assembly (25) releasably mounted on a hopper (9) at the top thereof, said screen assembly (25) having a screen releasably fastened therein; a vibrator unit (26) comprising a motor (18) attached to said hopper (9) at the bottom thereof, a base (20) having fastened therein elastic means (19) for flexibly vertically supporting said vibrator unit (26) and said separator unit (23), said vibrator unit also comprising an upper weight (21) and a lower weight (22), said screen assembly consisting of a frame (1) wherein the substance to be separated into two portions or to be filtered from a liquid is placed, a rubber packing (2), an upper rack (4) and a lower rack (6), a screen (5) firmly retained between said upper rack and said lower rack, said upper and lower rack having a peripheral edge, through-holes (33) on the peripheral edge of said upper and lower rack for insertion of screws (7), said hopper being morning-glory shaped and having a vertically extending portion (32) along the upper perimeter thereof, a plurality of hooks (8) extending vertically and located along said vertically extending portion (32), said hopper (9) having a discharge port (31) extending downwardly and obliquely therefrom, said hopper (9) having a flange (34) at the bottom thereof, a plurality of orifices (35) on said flange, said vibrator unit (26) having a cover (12) and a vibrating body (13), said cover (12) having a plurality of mounting orifices in number and location corresponding to said orifices (35) on said flange, said vibrating body (13) being of cylindrical shape and having an upper flange (44) and a bottom flange (45), said upper flange having a plurality of orifices (37), said upper flange being fixed to said flange (34) of said hopper, said bottom flange (45) having a plurality of orifices (38), a plurality of pins (39) extending vertically and downwardly from said bottom flange, said motor (18) having a housing, a motor shaft (24) vertically disposed at the center thereof, a plurality of projections extending radially and horizontally from said housing, said projections having a mounting hole (43), said upper weight (21) and lower weight (22) being T-shaped having a longitudinal portion and being disposed horizontally, each of said upper weight and lower weight having an orifice (47) at the top of said longitudinal portions of said T-shape and a second orifice (46) at the end of said longitudinal portion on the side thereof, said upper weight (21) and lower weight (22) being mounted on said motor shaft (24) by bolts (17) inserted in said second orifices (46), said bottom flange (45) of said vibrating body being fixed to said separator unit by means of bolts (14) inserted through said holes (38) of said bottom flange of said vibrating body and orifices (43) on said projection of said housing whereby when said motor is actuated, said upper weight and lower weight vibrate and rotate, an eccentric force results whereby the motor is inclined and vibration in horizontal, vertical and oblique direction results.

2. The vibro separator according to claim 1 wherein said base (20) has a flange (48), a plurality of strips (42) extending vertically around the inner surface thereof, said strips having pins (40), said elastic means (19) being helical springs, said springs being secured between said pins (40) and said pins (39) of said bottom flange (45) of said vibrating body.

* * * * *